(12) United States Patent
Matsunaga

(10) Patent No.: US 11,388,294 B2
(45) Date of Patent: Jul. 12, 2022

(54) IMAGE FORMING APPARATUS, CONTROL METHOD FOR IMAGE FORMING APPARATUS, AND CONTROL PROGRAM FOR IMAGE FORMING APPARATUS

(71) Applicant: Konica Minolta, Inc., Tokyo (JP)

(72) Inventor: Takahisa Matsunaga, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 123 days.

(21) Appl. No.: 16/902,546

(22) Filed: Jun. 16, 2020

(65) Prior Publication Data

US 2021/0006672 A1    Jan. 7, 2021

(30) Foreign Application Priority Data

Jul. 5, 2019    (JP) .............................. JP2019-126369

(51) Int. Cl.
*G10L 15/22*    (2006.01)
*H04N 1/00*    (2006.01)
*G10L 15/10*    (2006.01)
*G10L 15/08*    (2006.01)

(52) U.S. Cl.
CPC ......... *H04N 1/00403* (2013.01); *G10L 15/10* (2013.01); *G10L 15/22* (2013.01); *H04N 1/0092* (2013.01); *G10L 2015/088* (2013.01); *G10L 2015/223* (2013.01)

(58) Field of Classification Search
CPC ............................ G10L 15/22; H04N 1/00403
See application file for complete search history.

(56) References Cited

U.S. PATENT DOCUMENTS

2002/0013701 A1*  1/2002  Oliver ................ H04N 1/32128
                                                              704/231
2017/0372695 A1* 12/2017  Takei .................... G10L 15/187

FOREIGN PATENT DOCUMENTS

JP          2017-065090          4/2017

* cited by examiner

*Primary Examiner* — Ibrahim Siddo
(74) *Attorney, Agent, or Firm* — BakerHostetler

(57) ABSTRACT

An image forming apparatus may include: a storage that stores information in which a job type is associated with speech patterns for processings related to the job type; and a hardware processor that may: be inputted with a speech; acquire a job type; use speech patterns associated with a job type, which is acquired by the hardware processor and is being executed, to analyze a speech inputted during execution of the job; and execute the processings based on an analysis result by the hardware processor.

20 Claims, 11 Drawing Sheets

| PROCESSING | SPEECH PATTERN |
|---|---|
| STOP | ⌒‿⌒ |
| COPY | ⋮ |
| TWO-SIDED | ⋮ |
| PRINT LIST ONLY | ⋮ |
| TONER REMAINING AMOUNT CHECKING | ⋮ |
| PDF SAVING | ⋮ |
| SET VALUE LIST PRINTING | ⋮ |
| SETTING CANCELLATION | ⋮ |

| JOB TYPES | PROCESSING (KEYWORD) | SPEECH PATTERN (STORAGE FEATURE AMOUNT) |
|---|---|---|
| PRINT JOB | STOP | ~ |
| | COPY | ... |
| | PRINT LIST ONLY | ... |
| COPY JOB | STOP | ... |
| | TWO-SIDED | ... |
| | TONER REMAINING AMOUNT CHECKING | ... |
| SCAN JOB | STOP | ... |
| | PDF SAVING | ... |
| FAX JOB | STOP | ... |
| | SET VALUE LIST PRINTING | ... |
| | SETTING CANCELLATION | ... |

| JOB TYPES | PRIORITY | PROCESSING (KEYWORD) | SPEECH PATTERN (STORAGE FEATURE AMOUNT) |
|---|---|---|---|
| PRINT JOB | 1 | STOP | ⌇ |
|  | 2 | COPY | ... |
|  | 3 | PRINT LIST ONLY | ... |
| COPY JOB | 1 | STOP | ... |
|  | 2 | TWO-SIDED | ... |
|  | 3 | TONER REMAINING AMOUNT CHECKING | ... |
| SCAN JOB | 1 | STOP | ... |
|  | 2 | PDF SAVING | ... |
| FAX JOB | 1 | STOP | ... |
|  | 2 | SETTING CANCELLATION | ... |
|  | 3 | SET VALUE LIST PRINTING | ... |

FIG. 12

| JOB TYPE | NOISE LEVEL |
|---|---|
| PRINT JOB | 15 |
| COPY JOB | 15 |
| SCAN JOB | 8 |
| FAX JOB | 6 |

FIG. 13

| RANGE OF NOISE LEVEL | PRIORITY OF SPEECH PATTERN TO BE USED |
|---|---|
| 20 OR MORE | 1 |
| 10 OR MORE AND LESS THAN 20 | 1, 2 |
| LESS THAN 10 | 1 TO 3 |

IMAGE FORMING APPARATUS, CONTROL METHOD FOR IMAGE FORMING APPARATUS, AND CONTROL PROGRAM FOR IMAGE FORMING APPARATUS

CROSS-REFERENCE TO RELATED APPLICATIONS

The disclosure of Japanese Patent Application No. 2019-126369, which was filed on Jul. 5, 2019, is incorporated herein by reference in its entirety.

BACKGROUND

Technological Field

The present disclosure relates to an image forming apparatus, a control method for the image forming apparatus, and a control program for the image forming apparatus.

Description of the Related Art

There has been conventionally proposed an image forming apparatus that includes a microphone, into which a user's speech is inputted, and analyzes the inputted speech (see, for example, JP 2017-65090 A). This image forming apparatus analyzes the inputted speech by using speech patterns stored in advance and executes processing based on the analysis result.

In the speech analysis using speech patterns, the analysis accuracy of the speech is generally reduced if the number of speech patterns used is large. The image forming apparatus described in JP 2017-65090 A analyzes a speech by using all the speech patterns stored in advance. Therefore, the large number of speech patterns stored in advance has caused a problem that the analysis accuracy of the speech is reduced.

SUMMARY

The present disclosure has been made in view of the above problems, and an object in one aspect may be to provide an image forming apparatus, a control method for the image forming apparatus and a control program for the image forming apparatus, which improve the analysis accuracy of a user's speech.

To achieve the abovementioned object, according to an aspect of the present disclosure, an image forming apparatus reflecting one aspect of the present disclosure may comprise: a storage that stores information in which a job type is associated with speech patterns for processings or processes related to the job type; and a hardware processor that may: be inputted with a speech; acquire a job type; use speech patterns associated with a job type, which is acquired by the hardware processor and is being executed, to analyze a speech inputted during execution of the job; and execute the processings or processes based on an analysis result by the hardware processor.

BRIEF DESCRIPTION OF THE DRAWINGS

The advantages and features provided by one or more embodiments of the disclosure will become more fully understood from the detailed description given hereinbelow and the appended drawings which are given by way of illustration only, and thus are not intended as a definition of the limits of the present disclosure:

FIG. 12 is a diagram showing the correspondence between a job type and a noise level; and FIG. 13 is a diagram showing the correspondence between a range of a noise level and a priority to a speech pattern used.

DETAILED DESCRIPTION OF EMBODIMENTS

Figure 1:
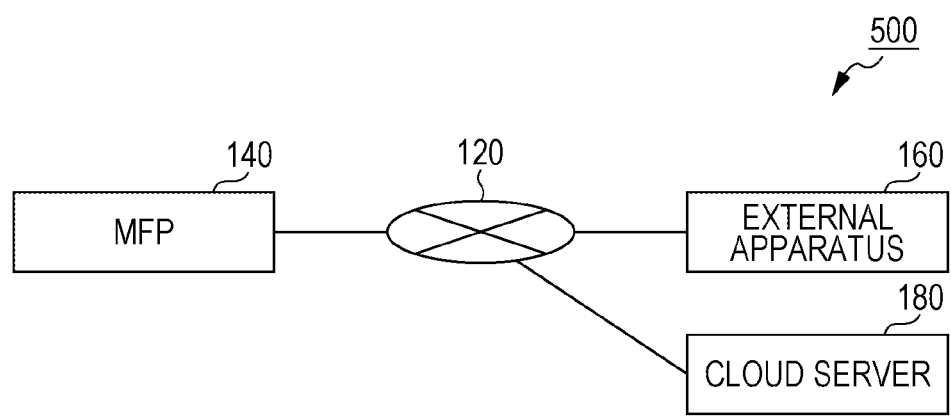
FIG. 1 is a functional block diagram of an image forming system.

Hereinafter, an image forming apparatus according to one or more embodiments of the present disclosure will be described with reference to the drawings. However, the scope of the disclosure is not limited to the disclosed embodiments. In the embodiments described below, when the number, amount and the like are referred, the scope of the present disclosure is not necessarily limited to the number, amount and the like unless otherwise stated. Identical parts and equivalent parts are denoted by the same reference numerals, and redundant explanations are not repeated in some cases. In addition, it is originally planned that at least part of the configuration in each embodiment is combined as appropriate and used.

First Embodiment

Configuration Example of Image Forming System

FIG. 1 is a diagram showing a configuration example of an image forming system 500 according to the present embodiment. Referring to FIG. 1, the image forming system 500 includes a multifunctional peripheral (MFP) 140, a network 120, an external apparatus 160, and a cloud server 180. The MFP 140, the external apparatus 160 and the cloud server 180 are connected via the network 120. The network 120 may be a wireless network or a wired network.

The MFP 140 corresponds to the "image forming apparatus" of the present disclosure. In the following, the MFP 140 has a color printer function and a facsimile function. Note that the MFP 140 is not limited to a color printer. For example, the MFP 140 may be a monochrome printer, a copying machine or a multifunction machine.

The external apparatus 160 transmits a command to the MFP 140 when a user inputs the command. The MFP 140 receives the command as a job based on the command. The external apparatus 160 is, for example, a personal computer (PC), a tablet, a smartphone, or the like. The cloud server 180 executes various processings. The cloud server 180 executes, for example, morphological analysis described later.

[Hardware Configuration of MFP]

Figure 2:
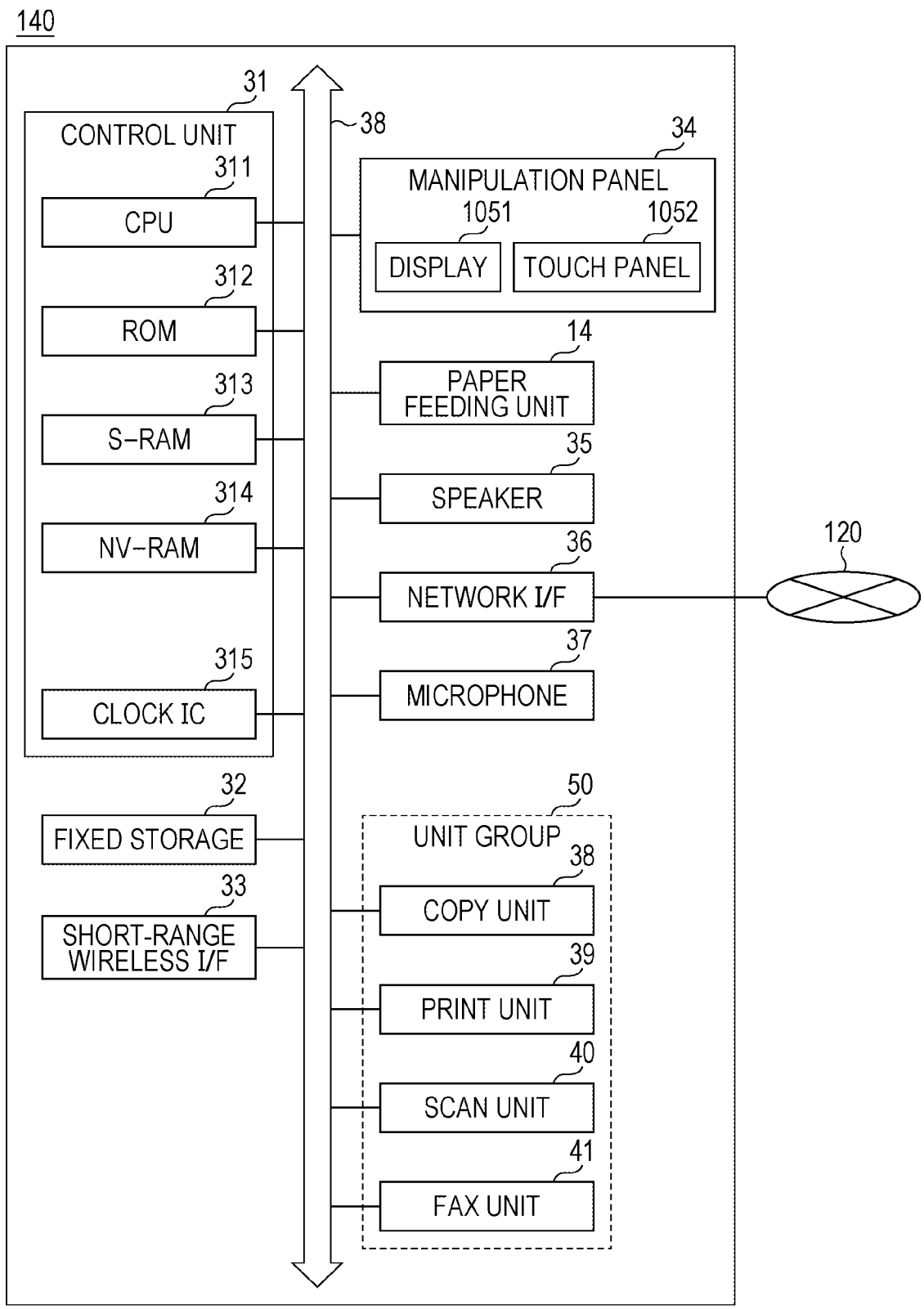
FIG. 2 is a diagram showing a hardware configuration example of an image forming apparatus.

FIG. 2 is a diagram showing a hardware configuration example of the MFP 140. Referring to FIG. 2, the MFP 140 has a control unit 31, a fixed storage 32, a short-range wireless interface (I/F) 33, a manipulation panel 34, a paper feeding unit 14, a speaker 35, a network I/F 36, a microphone 37, and a unit group 50. The control unit 31 is also referred to as a controller or a processor.

The control unit 31 has: a central processing unit (CPU) 311; a read only memory (ROM) 312 in which a control program is stored; a working static random access memory (S-RAM) 313; a non-volatile RAM (NV-RAM) 314 which stores various settings concerning image formation and is backed up by a battery; and a clock integrated circuit (IC) 315.

The CPU 311 comprehensively controls the entire MFP 140 by executing operation programs saved in the ROM 312 and the like.

The ROM 312 stores programs executed by the CPU 311 and other data. The S-RAM 313 serves as a work area for the CPU 311 to execute the programs and temporarily saves the programs, the data for executing the programs, and the like. The NV-RAM 314 is a non-volatile memory which is backed up by a battery and stores various settings concerning image formation, and the like. The clock IC 315 clocks the time as well as functions as an internal timer to measure the processing time, and the like. The fixed storage 32 includes a hard disk and the like and saves programs, various data and the like. The short-range wireless I/F 33 performs short-range wireless communication with other apparatuses.

The manipulation panel 34 includes a display 1051 and a touch panel 1052. The manipulation panel 34 is constituted by the display 1051 serving as a display apparatus and the touch panel 1052 serving as an input apparatus. Specifically, the manipulation panel 34 is realized by positioning and fixing the touch panel 1052 on the display 1051 (e.g., a liquid crystal display). The display 1051 can display a menu screen including characters, a job setting image, an option setting screen and the like. Note that the touch screen is also called a touch panel display, a display with a touch panel, or a touch panel monitor. Note that, for example, a resistive type or a capacitive type can be used as a touch position detecting method in the manipulation panel 34.

The paper feeding unit 14 accommodates paper for image formation. The speaker 35 outputs various speeches. The network I/F 36 transmits and receives various information via the network 120. The speaker 35 outputs various speeches such as a completion speech. The microphone 37 accepts speech input from the user.

The unit group 50 is constituted by a plurality of units that execute a job. Note that a job is also called "operation". The unit group 50 according to the present embodiment includes a copy unit 38, a print unit 39, a scan unit 40, and a FAX unit 41.

The copy unit 38 is a unit that copies a document set by a user. The document is set on a document table (not shown) of the MFP 140 by the user. The print unit 39 is a unit that forms on a recording medium, for example, an image based on image data transmitted from the external apparatus 160. The recording medium includes, for example, paper, sheets, and the like. The scan unit is a unit that scans the document set by the user. The FAX unit 41 is a unit that transmits image data and the like to another apparatus.

At least part of the configuration of one of at least two units of the copy unit 38, the print unit 39, the scan unit 40, and the FAX unit 41 overlaps with at least part of the configuration of the other unit in some cases. For example, the copy unit 38 includes a photoconductor as part of the configuration while the print unit 39 also includes this photoconductor. In the present embodiment, for convenience, units will be divided into the copy unit 38, the print unit 39, the scan unit 40 and the FAX unit 41 to be described for each job.

[Speech Analysis]

Next, the speech analysis according to the present embodiment will be described. In the present embodiment, the technique of analyzing the speech from the user includes pattern analysis and morphological analysis. The pattern analysis corresponds to a "first technique" of the present disclosure, and the morphological analysis corresponds to a "second technique" of the present disclosure. The pattern analysis is also called pattern recognition.

When the MFP 140 performs the morphological analysis on the speech from the user, the MFP 140 analyzes the characters of the inputted speech one by one. The MFP 140 performs semantic analysis by extracting the parts of speech in the morphological analysis. In the morphological analysis, the contents of the speech can be analyzed without fixing the contents of the speech (i.e., while the degree of freedom in the contents of the speech from the user can be improved). That is, in the morphological analysis, the user can speak freely. However, to perform the morphological analysis, the MFP 140 needs to analyze the morphemes of words and phrases without any omission. Therefore, erroneous recognition of one character may possibly lead to recognition of another word. Therefore, the morphological analysis has a feature that it is susceptible to noise while improving the degree of freedom in the contents (format) of the speech from the user.

Next, the pattern analysis will be described. The pattern analysis is typically pattern matching. For the pattern analysis, the MFP 140 keeps dictionary data in advance, and the dictionary data includes keywords and storage feature amounts associated with the keywords. In the present embodiment, this storage feature amount is also referred to as a "speech pattern". The MFP 140 extracts the feature amount of the inputted speech. The MFP 140 compares the extraction feature amount obtained by the extraction with the storage feature amounts stored as the dictionary data (performs pattern matching) to calculate a score indicating the similarity between the extraction feature amount and the storage feature amount. Moreover, the MFP 140 keeps a predetermined threshold. When the calculated score is determined to be higher than the threshold, the MFP 140 determines that the pattern matching has succeeded as well as determines that the speech pattern corresponding to the storage feature amount subjected to the pattern matching is a pattern matching ON result. Moreover, if the MFP 140 determines that the score is equal to or less than the threshold, the MFP 140 determines that the pattern matching has failed.

Figure 3:
FIG. 3 is a diagram showing a speech waveform of the word "color"

FIG. 3 is a diagram showing an example of a speech waveform (speech feature amount) of the speech "color" and a speech waveform (speech feature amount) of the speech "gray scale". For example, suppose noise has been generated in the course of a speech in a case where the user utters the speech "gray scale". In this case, suppose the MFP 140 could not have acquired the "sca" part of the speech "gray scale" but could acquire other parts of the speech. In the example in FIG. 3, the extraction feature amounts of the parts other than the "sca" of the "gray scale" are more similar to the storage feature amount of the "gray scale" than the storage feature amount of the "color". Therefore, the MFP 140 can derive an analysis result of "gray scale" as a result of the pattern analysis even if the "sca" part of the speech "gray scale" could not have been acquired due to noise.

Thus, in a certain aspect, the degree of freedom in the contents (format) of the speech from the user in the pattern analysis is lower than that in the morphological analysis. On the other hand, in a certain aspect, the pattern analysis is more resistant to noise than morphological analysis.

Figures 4, 5:
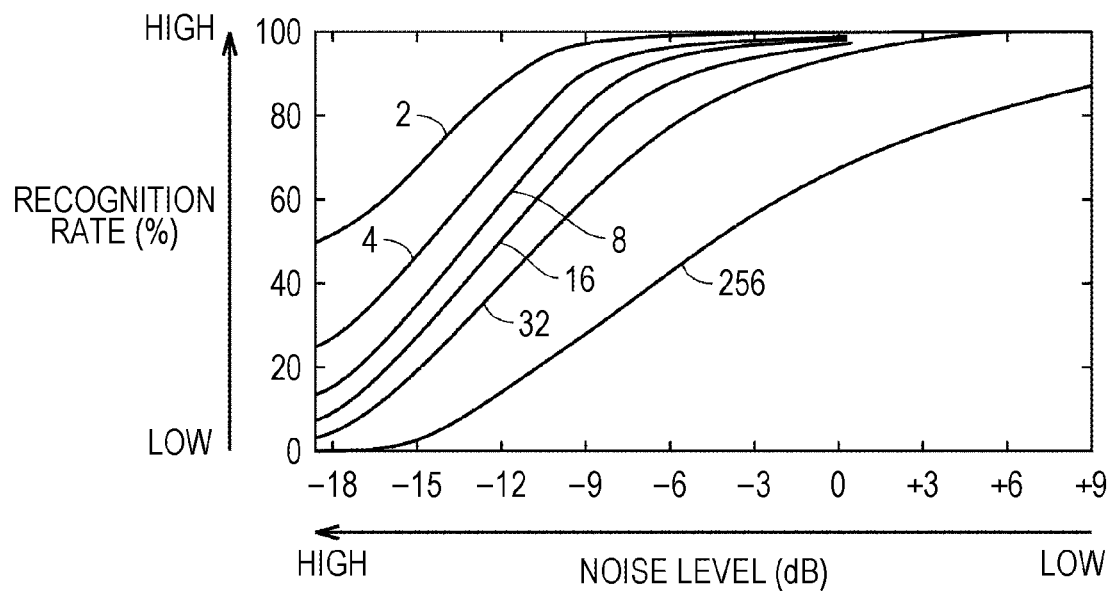
FIG. 4 is a diagram showing a relationship between a noise level and a speech recognition rate.
FIG. 5 is a diagram showing a speech pattern and the like according to a comparative example.

Next, the relationship among a noise level, the number of types of speech patterns and a speech recognition rate (speech analysis rate) will be described. FIG. 4 is a diagram for explaining the relationship among a noise level, the number of types of speech patterns and the speech recognition rate (speech analysis rate). The speech recognition rate is the accuracy of speech recognition or the accuracy of speech analysis.

In FIG. 4, the vertical axis indicates the speech recognition rate, and the horizontal axis indicates the noise level. Regarding the vertical axis in FIG. 4, the recognition rate increases in the upper direction. In addition, regarding the horizontal axis in FIG. 4, the noise level increases in the left direction. Moreover, 2, 4, 8, 16, 32, and 256, which are numerical values in FIG. 4, indicate the number of the respective types of speech patterns.

For example, when the noise is −9 dB in FIG. 4, the comparison is made between a case where the number of types of speech patterns is two and a case where the number of types of speech patterns is eight. The recognition rate in the case where the number of types of speech patterns is two is about 100%, whereas the recognition rate in the case where the number of types of speech patterns is eight is about 80%. Thus, as the number of types of speech patterns used in the speech analysis increases, the speech recognition rate tends to decrease. That is, the pattern analysis can increase the speech recognition rate by decreasing the number of types of speech patterns.

When the user inputs a speech into the microphone 37 of the MFP 140, noise around the MFP 140 and noise based on the execution of a job by the MFP 140 are also inputted into the microphone 37 in some cases. In this case, when the MFP 140 executes the morphological analysis on the speech from the user (when the user speaks freely), the MFP 140 needs to decompose the sentence indicated by the speech from the user into morphemes (particles, verbs, nouns and the like need to be distinguished). If the noise based on the execution of the job by the MFP 140 is also inputted into the microphone 37, the noise may possibly hinder the morphological analysis by the MFP 140. As a result, the accuracy of the morphological analysis is reduced in some cases. If the accuracy of the morphological analysis is reduced, a situation may possibly occur in which a job different from the job based on the speech uttered by the user is executed by the MFP 140, or the like.

On the other hand, when the MFP 140 executes the pattern analysis on the speech from the user, a reduction in the analysis accuracy of the speech (the recognition accuracy of the speech) can be suppressed compared with a case where the MFP 140 executes the morphological analysis. In addition, by decreasing the number of types of speech patterns used in the pattern analysis, it is possible to suppress a reduction in the analysis accuracy of the speech (the recognition accuracy of the speech).

Moreover, as described with reference to FIG. 4, when the number of types of speech patterns is 32 or less and the MFP 140 is not executing a job (no noise is being generated based on the execution of a job), the speech recognition rate by the MFP 140 is almost 100%. Meanwhile, when the number of types of speech patterns is 32 or less and the noise (the noise based on the execution of the job or the like) is −9 dB, the speech recognition rate is about 80%. When the noise is −15 dB in this case, the speech recognition rate is about 50%. As described above, when the speech recognition rate is reduced, the MFP 140 cannot recognize a speech such as "stop", which is a command of great urgency in the MFP 140, causing a problem that the reliability of the MFP 140 is impaired.

Thus, the MFP 140 according to the present embodiment typically executes the pattern analysis by decreasing the number of types of speech patterns.

FIG. 5 is a speech pattern model according to a comparative example. An MFP according to the comparative example stores the speech pattern model in FIG. 5. In the example in FIG. 5, eight processings are defined, and speech patterns (speech feature amounts) corresponding to the respective eight processings are associated therewith. Note that in FIGS. 5, 6 and the like show the waveform of the speech as the speech feature amount. In addition, in FIGS. 5, 6 and the like, the speech feature amount represents, for example, the processing for "stop" is represented by the speech feature amount and other processings are represented by ellipsises. In the example shown in FIG. 5, eight processings: "stop", "copy", "two-sided", "print a list only", "toner remaining amount checking", "PDF saving", "set value list printing", and "setting cancellation" are defined as the processings. Moreover, speech patterns are associated with the eight respective processings. That is, in the example in FIG. 5, eight speech patterns are associated.

Based on the example in FIG. 4, when there are eight speech patterns, the speech recognition rate is reduced compared with a case where there are two or four speech patterns.

Figure 6:
FIG. 6 is a diagram showing a speech pattern and the like according to an embodiment.

FIG. 6 is a speech pattern model according to the present embodiment. The MFP 140 according to the present embodiment stores the speech pattern models in FIG. 6. In the example in FIG. 6, a speech pattern is associated with each job that can be executed by the MFP 140.

Herein, the relationship between the "job" and the "processing" will be described. In the present embodiment, one or more "processings" are associated with one "job" type. In the present embodiment, typically, when a "job" associated with "processings" is being executed, the "processings" can be executed. In FIG. 6, for example, processings called "stop", "copy", and "list printing" are associated with a print job. "Stop" is, for example, a processing of stopping the job (the print job or the like) being executed. "Copy" is a processing of printing a document placed on the MFP 140 by the user. "List printing" is a processing of printing a predetermined list. The predetermined list is, for example, a list of network settings or the like.

Processings called "stop", "two-sided" and "toner remaining amount checking" are associated with a copy job. "Stop" is, for example, a processing of stopping the job (the copy job or the like) being executed. "Two-sided" is a processing of performing two-sided printing on a sheet (paper). "Toner remaining amount checking" is a processing of checking the remaining amount of toner in the MFP 140 and causing the display 1051 to display the checked remaining amount of toner.

Processings called "stop" and "PDF saving" are associated with a scan job. "Stop" is, for example, a processing of stopping the job (the scan job or the like) being executed. "PDF saving" is a processing of saving a scanned image in a portable document format (PDF format).

Processings called "stop", "set value list printing", and "setting cancellation" are associated with a FAX job. "Stop" is, for example, a processing of stopping the job (the FAX job or the like). "Set value list printing" is, for example, a processing of printing a list of FAX settings. "Setting cancellation" is, for example, a processing of canceling the FAX settings.

Moreover, "stop", "copy", and "two-sided" defined in the keyword in FIG. 6 are "words". "Toner remaining amount checking", "PDF saving", "set value list printing", and "setting cancellation" defined in the keyword in FIG. 6 are "phrases". "Print a list only" defined in the keyword in FIG. 6 is a "sentence". In addition, the keywords composed of a sentence may include, for example, "change the settings to one-sided printing and color printing" and "change the settings to two-sided printing and monochrome printing".

Moreover, the keyword may include an attribute different from "word", "phrase", and "sentence". For example, the keyword may include a "clause" as a different attribute. For example, the "clause" is a keyword such as "two-in-one", "in monochrome" or "in two-sided printing". Furthermore, the keyword may include "a plurality of sentences" as a different attribute. For example, the keyword is "Make the size A4. Set the color setting to color, and print three copies". This keyword is composed of a sentence "make the size A4" and a sentence "set the color setting to color, and print three copies."

Further, in the example in FIG. 6, the number of types of speech patterns for the processings related to all types of jobs that can be executed by the MFP 140 is eight including "stop", "copy", "list printing", "two-sided", "toner remaining amount checking", "stop", "PDF saving", "setting cancellation", and "set value list printing". Note that "stop" is duplicated across the print job, the copy job, the scan job, and the FAX job in the example in FIG. 6, and these duplicated "stops" are regarded as one processing.

In the example in FIG. 6, the number of types of speech patterns for the processings related to the job types is two or three regardless of any of the print job, the copy job, the scan job and the FAX job.

As described above, the MFP 140 is set such that the number of types of speech patterns (two or three) for the processings related to a job type is less than the number of types of speech patterns (eight) for the processings related to all the job types that can be executed by the MFP 140.

Moreover, in FIG. 6, the "processing" corresponds to the "keyword included in the speech from the user". Therefore, the "processing" is referred to as the "keyword" in some cases. Furthermore, in the example in FIG. 6, it can be said that one or more keywords of "processings" are associated with one "job" type.

In the present embodiment, when the user inputs a speech into the microphone 37 and another job is being executed, the pattern analysis is executed by using speech patterns for another job. Accordingly, the number of types of speech patterns used by the MFP 140 can be decreased. As a result, the accuracy of the speech analysis can be improved.

In addition, the processing (keyword) and the storage feature amount may be collectively expressed as a "speech pattern" in FIG. 6. Note that two or more processings (keywords) are associated with one job in the example in FIG. 6, but one processing (keyword) may be associated with one job.

Application Example of MFP According to Present Embodiment

Figure 7:
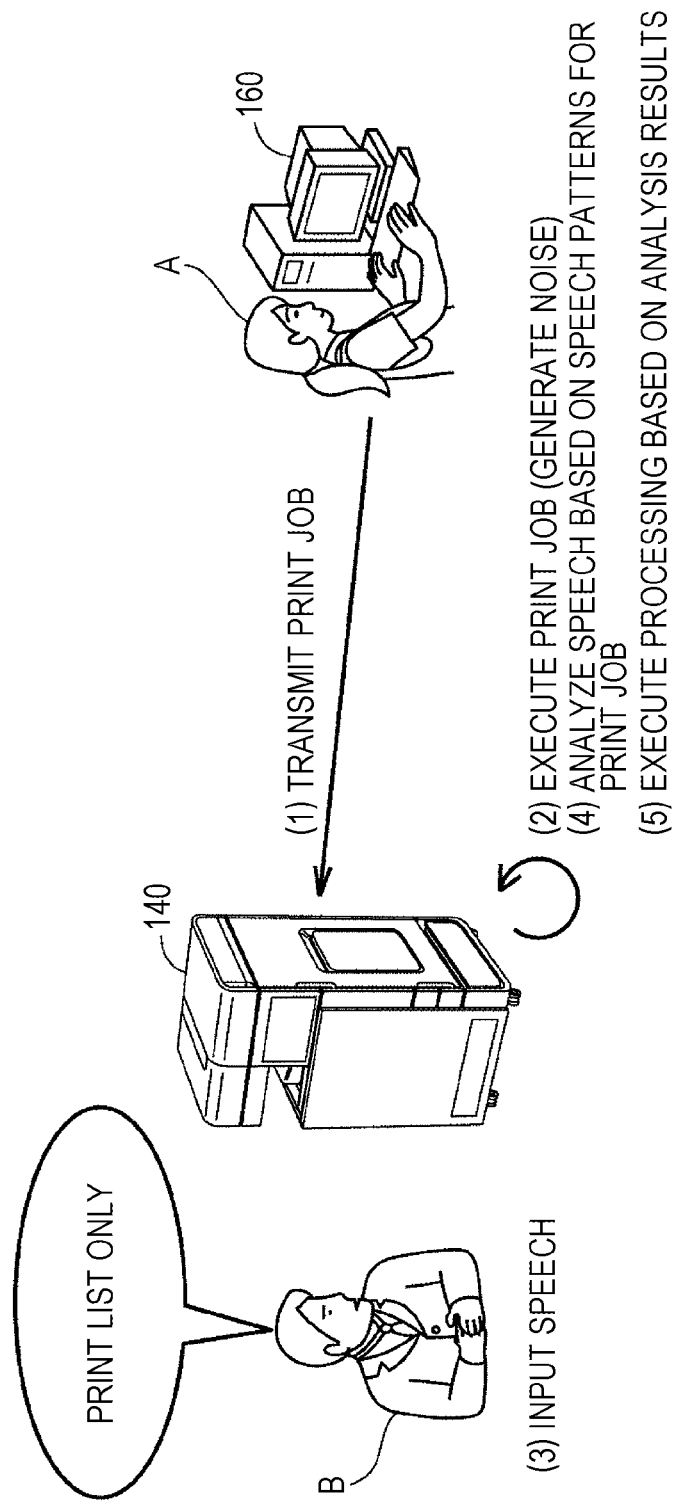
FIG. 7 is a diagram showing an application example of an MFP according to the embodiment.

Next, an application example of the MFP 140 according to the present embodiment will be described. FIG. 7 is a diagram showing an application example of the MFP 140 according to the present embodiment. In Step (1), a first user A transmits a print job from the external apparatus 160 to the MFP 140 by inputting a print command into the external apparatus 160.

Next, in Step (2), the MFP 140 executes the print job transmitted from the external apparatus 160. While the print job is being executed by the MFP 140, noise is generated based on the print job. Next, in Step (3), while the print job is being executed by the MFP 140, a second user B utters a speech, thereby causing the MFP 140 to execute a job based on the speech. The second user B and the first user A are different users. In Step (3), suppose that the second user B has uttered a speech "print a list only".

Hereinafter, the job executed by the command of the first user A is referred to as a "pre-job". Moreover, while the pre job is being executed, the MFP 140 executes a processing based on the command according to the command (command by speech input) from the second user B. This processing is, for example, a "processing" shown in FIG. 6. In addition, the processing based on the command of the second user B may be expressed as a "job" or "post-job". In the example in FIG. 7, the pre job is the "print job", and the processing (post-job) is the "processing of printing a list".

Next, in Step (4), the MFP 140 uses the speech pattern for the pre job being executed (based on the speech pattern for the pre job being executed) to analyze the speech inputted by the second user B. Since the pre job is the print job in the example in FIG. 6, the MFP 140 identifies three speech patterns, "stop", "copy", and "print a list only", as the speech patterns for the print job. The MFP 140 uses the three identified speech patterns to analyze the speech "print a list only" which is the speech inputted by the second user B.

Next, in Step (5), the MFP 140 executes the job (post-job) based on the analysis result at optimal timing. In the present embodiment, the job based on the analysis result is a job for executing list printing. The optimal timing is, for example, the timing when the pre job is completed.

Functional Configuration Example of Control Unit

Figure 8:
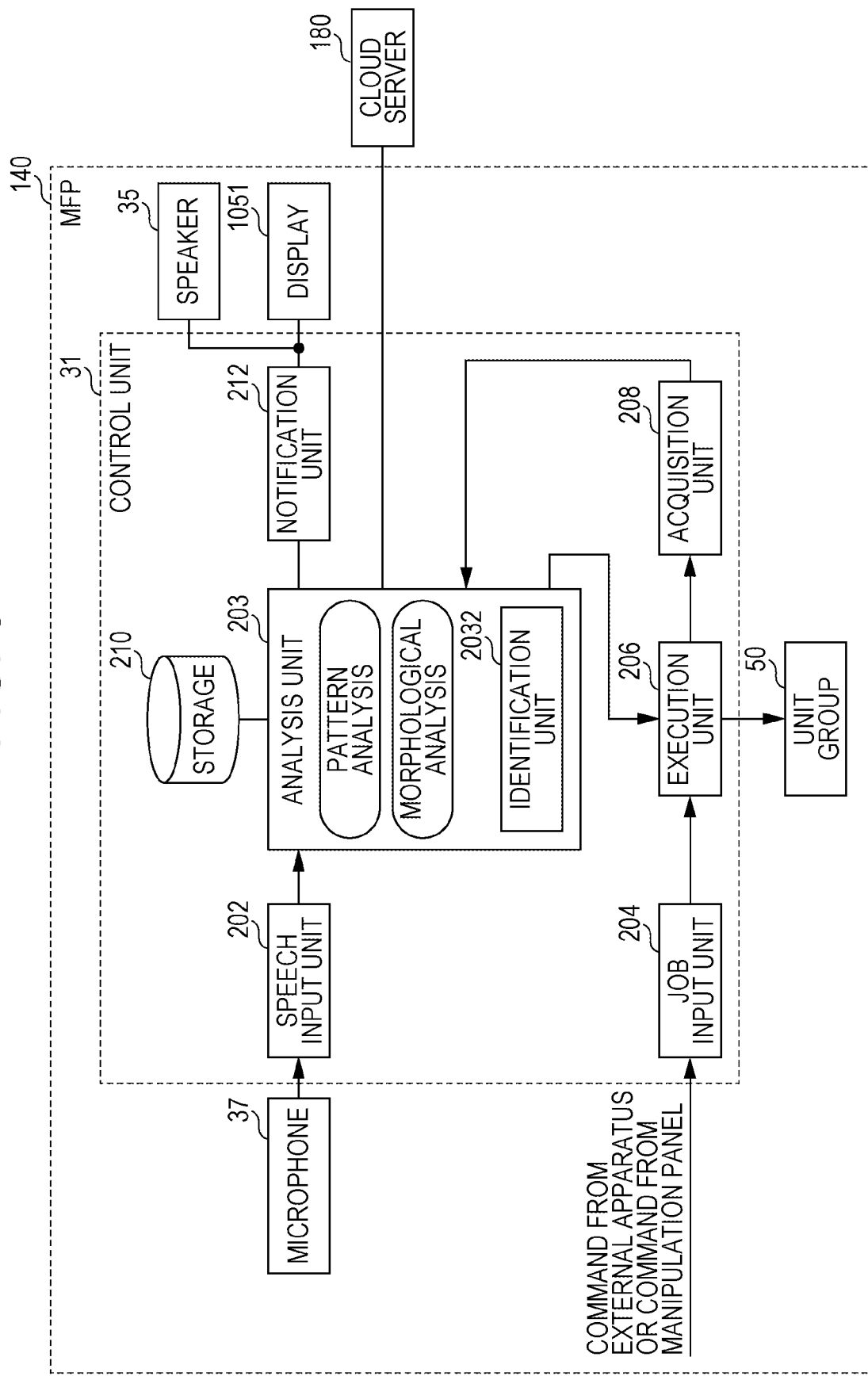
FIG. 8 is a functional block diagram of a control unit and the like according to the embodiment.

Next, a functional configuration example of the control unit 31 and the like will be described. FIG. 8 is a functional block diagram of the control unit 31. The control unit 31 has a speech input unit 202, an analysis unit 203, a notification unit 212, a job input unit 204, an execution unit 206, and an acquisition unit 208. Moreover, the analysis unit 203 has an identification unit 2032.

When the first user A has inputted a command through the external apparatus 160, the command is inputted into the job input unit 204 as a pre job based on the command. In addition, when the first user A has inputted a command through the manipulation panel 34, the command is inputted into the job input unit 204 as a pre job based on the command.

The execution unit 206 executes the job (pre-job) inputted into the job input unit 204. The execution unit 206 causes a unit corresponding to the type of the pre job to execute the job. For example, when the pre job is the print job, the execution unit 206 causes the print unit 39 to execute the print job. For example, the execution unit 206 causes the print unit 39 to execute the print job by transmitting a control signal to the print unit 39.

Moreover, the acquisition unit 208 acquires the job type to be executed. The timing when the acquisition unit 208 acquires the job type may be any timing. In the present embodiment, when the execution unit 206 executes the job, the job type is acquired. For example, when the control unit 31 has detected a command accompanied by a job, the acquisition unit 208 acquires the job type for the execution in the firmware corresponding to the unit for the job.

For example, in FIG. 7, when the external apparatus 160 has transmitted the print job to the MFP 140 by the manipulation of the first user A, the print job is stored in a job queue. Furthermore, another job has already been stored in the job queue in some cases before this print job is stored in the job queue. When all other jobs already stored in the job queue are completed and this print job is to be executed, the MFP 140 according to the present embodiment acquires the "print job" which is the type of the print job. The acquisition unit 208 transmits job type information to the analysis unit 203. The job type information is information indicating the job type acquired by the acquisition unit 208.

The storage 210 stores in advance the speech pattern model shown in FIG. 6, and the like. The speech pattern model shown in FIG. 6 may be such that, for example, the model at the time of the shipment from the factory can be customized. Moreover, the speech pattern model shown in FIG. 6 may be such that, for example, the MFP 140 may newly construct or change the model shown in FIG. 6 by the speech from the user.

A procedure for newly constructing or changing the model shown in FIG. 6 by the speech from the user will be briefly described. Herein, a case where a speech pattern of a speech "stop" is stored in the MFP 140 will be described.

First, the user manipulates the manipulation panel 34 of the MFP 140 to control the mode of the MFP 140 in a pattern registration mode. When the MFP 140 is controlled in the pattern registration mode, the user utters a speech "stop". The MFP 140 extracts the feature amount of the speech "stop" and stores the feature amount of the speech as a storage feature amount (speech pattern). Thereafter, the user manipulates the manipulation panel 34 to command the MFP 140 to associate the job with the storage feature amount.

When the speech from the user has been inputted into the microphone 37, the microphone 37 converts the speech into electric signals, and the electric signals are inputted into the speech input unit 202. The speech input unit 202 inputs the electric signals of the speech. That is, the speech from the user is inputted into the speech input unit 202.

The analysis unit 203 can execute the pattern analysis and the morphological analysis on the speech inputted into the speech input unit 202. Based on the job type information transmitted from the acquisition unit 208, the analysis unit 203 identifies the job type being executed. In the example in FIG. 7, the analysis unit 203 identifies the print job as the job being executed.

The analysis unit 203 analyzes the speech by using the speech patterns of the processings for the job type identified by the analysis unit 203 in the speech pattern model of the storage 210. In other words, the analysis unit 203 refers to the speech pattern model in the storage 210, acquires the speech patterns of the processings for the job type identified by the analysis unit 203, and uses the acquired speech patterns to analyze the speech. The analysis unit 203 also analyzes the speech by pattern matching.

In the example in FIG. 7, the job identified by the analysis unit 203 (the job being executed) is the print job. Therefore, the analysis unit 203 analyzes the speech by using each of the speech patterns for "stop", "copy", and "print a list only" which are the processings (keywords) for the print job. In the example in FIG. 7, since the second user B has uttered the speech "print a list only", the speech "print a list only can be recognized with high accuracy.

Furthermore, suppose that there is no speech pattern whose score obtained by the pattern matching with respect to the feature amount of the inputted speech (extraction feature amount) is equal to or greater than a threshold. That is, for example, suppose that the second user B has uttered a speech "setting cancellation". In this case, the score between the extraction feature amount of the speech "setting cancellation" and the storage feature amount of each of the three processings for the print job (the storage feature amount of the processing "stop", the storage feature amount of the processing "copy", and the storage feature amount of "print a list only") is likely to be less than the threshold. In the present embodiment, "the score is less than the threshold" is referred to as "the pattern matching fails". When the pattern matching has failed, the analysis unit 203 analyzes the speech with a technique different from the pattern matching. In the present embodiment, the technique different from the pattern matching may be any technique. The technique different from the pattern matching is, for example, "morphological analysis".

In the present embodiment, the MFP 140 causes the cloud server 180 to execute the morphological analysis. The MFP 140 transmits, for example, a request signal to the cloud server 180. The request signal is a signal for causing the cloud server 180 to execute the morphological analysis. Moreover, the request signal includes the extraction feature amount extracted by the analysis unit 203. The cloud server 180 stores a model (e.g., a morphological model) necessary for performing the morphological analysis. The morpheme model is, for example, a model in which a feature amount of each morpheme is stored. The cloud server 180 executes the morphological analysis based on the transmitted feature amount and the morphological model. The cloud server 180 transmits the result of the morphological analysis performed by the cloud server 180 to the MFP 140, which is the transmission source of the request signal.

Furthermore, when a speech has been inputted, the MFP 140 causes the cloud server 180 to execute the morphological analysis even if a job is not being executed.

In addition, the notification unit 212 makes notification of the processings (keywords) related to the job type acquired by the acquisition unit 208. For example, the notification unit 212 causes the display 1051 to display an image that allows the user to specify the processing related to the job type acquired by the acquisition unit 208. For example, when the job type is the "print job", the processings related to the job type are "stop", "copy", and "print a list only". The notification unit 212 causes the display 1051 to display an image that allows the user to specify "stop," "copy" and "print a list only" as the processings related to the "print job".

Figure 9:
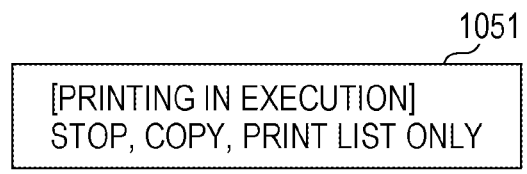
FIG. 9 is a diagram showing an example of an image displayed on a display according to the embodiment.

FIG. 9 is an example of a screen that the display 1051 displays. In the example in FIG. 9, the display 1051 displays the job being executed (the print job in the example in FIG. 9) in parentheses. The display 1051 displays character images "stop", "copy", and "print a list only" as the processings of the speech patterns associated with the job type.

With this display, the user can recognize the keywords recognized by the MFP 140 with high accuracy.

Moreover, the notification unit 212 causes the speaker 35 to output a speech that allows the user to specify the speech pattern associated with the job type acquired by the acquisition unit 208. For example, the speaker 35 outputs a speech such as "the job being executed is the print job. The speeches that are subjected to recognition are "stop", "copy", and "print a list only".

Furthermore, as described with reference to FIG. 4 and the like, the smaller the number of types of speech patterns used for the pattern analysis, the higher the accuracy of the pattern analysis. Therefore, the identification unit 2032 identifies a speech pattern that has not been used for a predetermined period of time. The predetermined period of time may be any period and is, for example, one year. The analysis unit 203 executes the pattern analysis without using the speech pattern identified by the identification unit 2032. In other words, the analysis unit 203 excludes the speech pattern identified by the identification unit 2032 and executes the pattern analysis by using the speech patterns not excluded.

For example, in the example in FIG. 6, when a speech from the second user B is inputted into the MFP 140 during the execution of the print job and the speech pattern of the processing "copy" has not been used for the predetermined period of time among the processings related to the print job, the analysis unit 203 analyzes the speech by using the speech pattern of the processing "stop" and the speech pattern of the processing "print a list only". Accordingly, the number of types of speech patterns used for the pattern analysis can be decreased. Thus, the accuracy of the pattern analysis can be improved.

Moreover, a speech from the second user B is inputted during the execution of two or more pre-jobs in some cases. In the example in FIG. 7, Step (2) is a case where the print job and the copy job are being executed. In this case, the "print job" corresponds to a "first job" of the present disclosure, and the "copy job" corresponds to a "second job" of the present disclosure. Note that the fact that the print job and the copy job are being executed means that, for example, a printing job included in the print job and a scan job included in the copy job are being executed.

In this case, the analysis unit 203 acquires a common speech pattern between the speech patterns associated with the print job type and the speech patterns associated with the copy job type. In the example in FIG. 6, the common speech pattern is the speech pattern of the processing "stop", and the number of common speech patterns is "one". The total value of the number of types of speech patterns associated with the print job type and the number of types of speech patterns associated with the copy job type is "five". If the analysis unit 203 is configured to identify a common speech pattern as in the present embodiment, the number can be decreased from "five" to "one". Therefore, the MFP 140 according to the present embodiment can further improve the accuracy of the pattern analysis.

In the present embodiment in particular, the processing of the common speech pattern is the processing of stopping the job being executed (the processing "stop"). When an abnormality such as a jam has occurred in the MFP 140, it is preferable to stop the job being executed from the viewpoint of preventing damage to the components of the MFP 140, and the like. That is, it can be said that the processing of stopping the job being executed is the processing having a higher priority than other processings. Accordingly, as in the present embodiment, the processing of the common speech pattern is the processing of stopping a plurality of jobs being executed (the processing having a high priority). Thus, when a speech is inputted during execution of a plurality of jobs, the MFP 140 according to the present embodiment can improve the recognition accuracy of the speech for the processing of stopping the plurality of jobs being executed as the common processing. Therefore, the security of MFP 140 can be enhanced.

Moreover, when a speech from the second user B is inputted and the MFP 140 is not executing a job, a noise sound is less likely to be inputted into the MFP 140. Therefore, in this case, the MFP 140 does not execute the pattern analysis (the analysis that is resistant to noise), but executes the morphological analysis (the analysis that is less resistant to noise but has a high degree of freedom in the contents of the speech from the user).

Furthermore, from the result of the pattern analysis or the result of the morphological analysis by the analysis unit 203, a keyword (processing name) included in the speech from the user is identified. The analysis unit 203 transmits, to the execution unit 206, information indicating the processing name. The execution unit 206 executes the processing indicated by the transmitted information.

[Flowchart for MFP]

Figure 10:
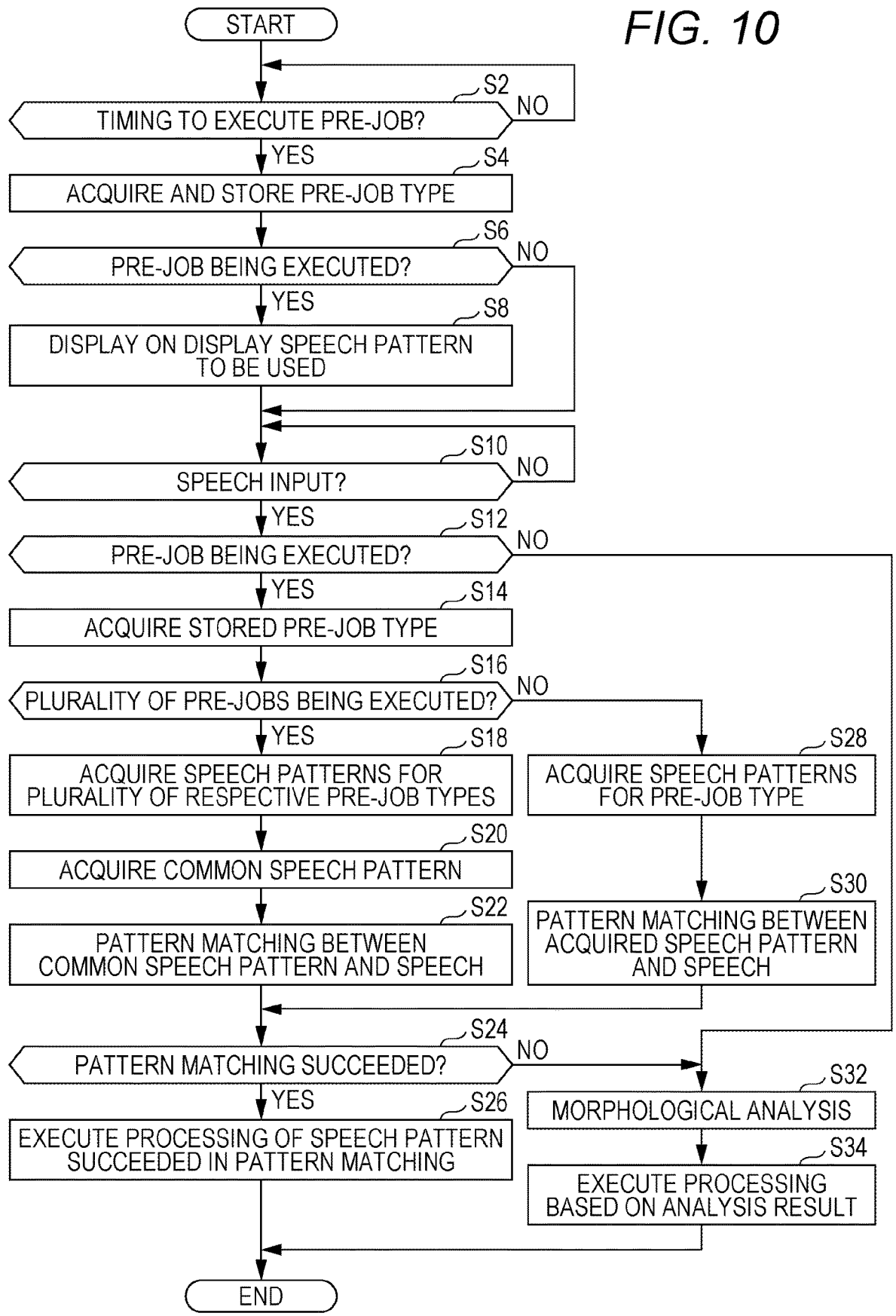
FIG. 10 is a flowchart for the MFP according to the embodiment.

FIG. 10 is a diagram showing a flowchart for the MFP 140. The process of the MFP 140 will be described using FIG. 10. The MFP 140 executes the process in FIG. 10 by every predetermined period (e.g., one second).

In Step S2, the control unit 31 determines whether or not the execution unit 206 has reached the timing of executing the pre-job. In Step S2, the timing when the execution unit 206 executes the pre job is, for example, the timing when all other jobs already stored in the job queue are completed and the pre-job is to be executed. In Step S2, the control unit 31 repeats the processing of Step S2 until the timing to execute the pre job is reached. When it has been determined to be "YES" in Step S2, the process proceeds to Step S4.

In Step S4, the acquisition unit 208 acquires the pre job type and stores the type in a predetermined area. The predetermined area is, for example, the S-RAM313. Moreover, when it has been determined in Step S4 that two or more pre jobs are being executed, the acquisition unit 208 acquires the respective job types of the two or more pre-jobs.

Next, in Step S6, the control unit 31 determines whether or not the pre job is being executed. When the control unit 31 has determined in Step S6 that the pre job is being executed (YES in Step S6), the process proceeds to Step S8. When the control unit 31 has determined in Step S6 that the pre job is not being executed (NO in Step S6), the process proceeds to Step S10.

In Step S8, the notification unit 212 causes the display 1051 to display an image that allows the user to specify the processing (keyword) related to the job type acquired by the acquisition unit 208 (see FIG. 9). In addition, although not shown in FIG. 10, the notification unit 212 may cause the speaker 35 to output a speech that allows the user to specify a speech pattern.

Next, in Step S10, the control unit 31 determines whether or not a speech has been inputted into the speech input unit 202. In Step S10, when the control unit 31 has determined that a speech has been inputted into the speech input unit 202 (YES in Step S10), the process proceeds to Step S12. In addition, in Step S10, when the control unit 31 has determined that a speech has not been inputted into the speech input unit 202 (NO in Step S10), the control unit 31 repeats the processing of Step S10.

In Step S12, the control unit 31 determines whether or not a pre job is being executed. In Step S12, when the control unit 31 has determined that the pre job is being executed (YES in step S12), the process proceeds to Step S14. In addition, in Step S12, when the control unit 31 has determined that the pre job is not being executed (NO in Step S12), the process proceeds to Step S32. In Step S32, the control unit 31 causes the cloud server 180 to execute the morphological analysis. Next, in Step S34, the execution unit 206 executes the processing based on the analysis result.

Furthermore, in Step S14, the acquisition unit 208 acquires the pre job type stored in Step S4. The acquisition unit 208 transmits the acquired pre job type to the analysis unit 203.

Next, in Step S16, the control unit 31 determines whether or not a plurality of pre-jobs is being executed. When it has been determined to be YES in Step S16, the process proceeds to Step S18. In Step S18, the analysis unit 203 acquires speech patterns for the plurality of respective pre job types. For example, when the control unit 31 has determined in Step S16 that the print job and the copy job are being executed, the analysis unit 203 acquires the respective speech patterns "stop", "copy", and "print a list only" for the print job as well as acquires the respective speech patterns "stop", "two-sided", and "toner remaining amount checking" for the copy job in the example in FIG. 6. Next, in Step S20, the analysis unit 203 acquires a common speech pattern among the acquired speech patterns. In the present embodiment, the common speech pattern is the speech pattern of the processing "stop".

Next, in Step S22, the analysis unit 203 performs the pattern matching between the speech determined to be inputted in Step S10 and the common speech pattern.

And, when it has been determined to be NO in Step S16, that is, when it has been determined that the number of pre jobs being executed is one, the process proceeds to Step S28. The analysis unit 203 acquires the speech patterns for the pre job type. In the example in FIG. 7, the analysis unit 203 acquires the speech patterns for the print job of the pre-job. Next, in Step S30, the analysis unit 203 performs the pattern matching between the speech determined to be inputted in Step S10 and the speech patterns acquired in Step S28. When the processing of Step S22 and the processing of Step S30 are completed, the process proceeds to Step S24.

In Step S24, the analysis unit 203 determines whether or not the pattern matching has succeeded. The pattern matching includes the pattern matching in Step S22 and the pattern matching in Step S30. When it has been determined to be YES in Step S24, the process proceeds to Step S26. In addition, when it has been determined to be NO in Step S24, the process proceeds to Step S32.

In Step S26, the execution unit 206 executes the job of the speech pattern succeeded in the pattern matching. For example, in the example in FIG. 7, when the pattern matching has succeeded for the speech "print a list only", the execution unit 206 executes the list printing.

BRIEF SUMMARY (1) As described with reference to FIG. 4, the MFP 140 can improve the accuracy of the speech recognition when the number of types of speech patterns is small. For example, in the speech pattern model according to the comparative example shown in FIG. 5, the speech patterns are defined for the eight respective processings. The MFP according to the comparative example analyzes a speech by using all the defined (stored) speech patterns (eight speech patterns). Therefore, when the number of defined (stored) speech patterns is large, the accuracy of speech recognition is reduced. On the other hand, in the present embodiment, as shown in FIG. 6, the storage 210 stores a model in which job types are associated with speech patterns of the processings related to the job types. Moreover, the analysis unit 203 analyzes the speech by using the speech patterns associated with the job types (the job being executed) acquired by the acquisition unit 208. Therefore, the analysis unit 203 according to the present embodiment can lower the number of types of speech patterns to be used, compared with the speech pattern model according to the comparative example. That is, the MFP according to the comparative example analyzes the speech by using eight speech patterns, whereas the MFP 140 according to the present embodiment analyzes the speech by using the speech patterns (two or three speech patterns in the example in FIG. 6) associated with the job type being executed. Therefore, compared with the MFP according to the comparative example, the MFP 140 according to the present embodiment can improve the analysis accuracy (recognition accuracy) of speech.

(2) Furthermore, in the example in FIG. 6, the number of types of speech patterns for the processings related to a type of job is two or three regardless of whether the job type is the print job, the copy job, the scan job or the FAX job. In addition, the number of types of speech patterns for the processings related to all the types of jobs that can be executed by the MFP 140 is eight.

As described above, the MFP 140 is set such that the number of types of speech patterns (two or three) for the processings related to a job type is less than the number of types of speech patterns (eight) for the processings related to all the job types that can be executed by the MFP 140. Therefore, no matter what type of job is being executed when the speech from the second user B is inputted into the MFP 140, the number of speech patterns used to analyze the speech can be lowered.

(3) Further, when a speech is inputted during the execution of the first job (the print job in the above description) and the second job (the copy job in the above description), the analysis unit 203 analyzes the speech by using a common speech pattern between the speech patterns associated with the first job type and the speech patterns associated with the second job type. Therefore, since the MFP 140 can lower the number of speech patterns used for the speech analysis in a case where two jobs (the first job and the second job) are being executed compared with a case where one job is executed, the accuracy of the speech analysis can be further improved.

(4) Moreover, in the present embodiment, the common speech pattern is a speech pattern for the processing of stopping the first job and the second job ("stop" in the present embodiment). Therefore, when the first job and the second job are being executed, it is possible to improve the recognition accuracy of the speech for the processing of stopping the plurality of jobs being executed as the common processing. Therefore, the MFP 140 can suppress the risk of not being able to stop the plurality of jobs so that the safety of the MFP 140 can be enhanced.

(5) Furthermore, the analysis unit 203 can analyze the speech by using the second technique different from the first technique (the pattern analysis in the present embodiment) that analyzes the speech by using the speech patterns associated with the job type acquired by the acquisition unit 208. Therefore, the MFP 140 can analyze the speech with various techniques.

(6) Further, as shown in Steps S24, S32, and S34 in FIG. 10, when the pattern matching by the pattern analysis has failed (NO in Step S24), the MFP 140 analyzes the speech by the morphological analysis (Step S32). Therefore, even when the pattern matching has failed, the MFP 140 can compensate the analysis processing on the speech.

(7) Moreover, when the pattern matching by the pattern analysis has succeeded (YES in Step S24), the MFP 140 executes the processing corresponding to the speech pattern based on the success in the pattern matching. For example, in a case where the speech "print a list only" has been recognized due to the success in the pattern matching in the pattern matching performed on the inputted speech, the speech pattern based on the success in the pattern matching is the speech pattern for the processing "print a list only". The MFP 140 executes the processing of the speech pattern "print a list only" as the speech pattern based on the success in the pattern matching, that is, "list printing only". Therefore, when the pattern matching has succeeded, the MFP 140 can execute the processing desired by the user.

(8) Furthermore, when a speech is inputted during non-execution of a job (NO in Step S12), the analysis unit 203 analyzes the speech with the morphological analysis (Step S32). During the non-execution of a job, no noise is generated based on a job. Therefore, during the non-execution of a job, the morphological analysis of the speech can improve the degree of freedom in the contents (format) of the speech from the user. As a result, the speech analysis can be flexibly executed.

(9) Further, as shown in FIG. 8, the MFP 140 causes the cloud server 180 to execute the morphological analysis processing. Therefore, the MFP 140 can reduce the processing burden of the morphological analysis.

(10) Moreover, the notification unit 212 makes notification of the processings related to the job type acquired by the acquisition unit 208. Accordingly, the second user B can grasp in advance the processings (keywords) recognized by the MFP 140 when the second user B utters a speech. Therefore, the user convenience can be improved.

(11) Furthermore, the notification unit 212 causes the display 1051 to display an image that enables specification of the processing related to the job type acquired by the acquisition unit 208 (see FIG. 9). Therefore, the MFP 140 makes the second user B visually recognize the display 1051 to allow the second user B to grasp in advance the processings (keywords) when the second user B utters a speech.

(12) Further, the notification unit 212 causes the speaker 35 to output a speech that enables specification of the processing related to the job type acquired by the acquisition unit 208. Therefore, the MFP 140 makes the second user B listen to the speech from the speaker 35 to allow the second user B to grasp in advance the processings (keywords) when the second user B utters a speech.

(13) Moreover, the identification unit 2032 identifies a speech pattern that has not been used for a predetermined period of time. In the analysis unit 203, the speech pattern that has not been used for a predetermined period of time is less likely to be used in the future (less likely to be uttered by a user as a speech). Accordingly, the analysis unit 203 analyzes the speech without using the speech pattern identified by the identification unit 2032 (the speech pattern that has not been used for a predetermined period of time). Therefore, the analysis unit 203 can decrease the number of types of speech patterns to be used. As a result, the analysis accuracy of the speech can be improved.

(14) Furthermore, for example, it is considered that the acquisition unit 208 adopts a configuration in which a job type is acquired while the job is being executed by the execution unit 206. However, if the MFP 140 adopts this configuration, the execution of the job and the processing of acquiring the job type may possibly overlap, resulting in a problem that the process is concentrated. Thus, in the present embodiment, when the execution unit 206 executes a job, the acquisition unit 208 acquires the job type. With such a configuration, it is possible to prevent the execution of the job, and the processing of acquiring the job type from overlapping. As a result, the process can be prevented from being concentrated.

(15) Further, as shown in FIG. 6, the speech pattern includes a speech pattern of words, phrases, sentences and the like. Therefore, when the second user B utters a speech such as a word, a phrase, a sentence and the like, the analysis unit 203 can appropriately analyze the speech from the second user B.

Second Embodiment

As shown in Steps S18, S20 and S22 in FIG. 10, when a plurality of pre jobs is being execute and a speech is inputted, the MFP 140 of the aforementioned embodiment has been described to acquire a common speech pattern among the plurality of pre jobs and analyze the speech by using the acquired common speech pattern. However, the MFP 140 may analyze the speech by using a predetermined speech pattern in addition to the common speech pattern. The MFP 140 decides in advance a speech pattern that meets a predetermined criterion. The predetermined criterion is, for example, a criterion that the number of times used in the analysis processing by the analysis unit 203 is large.

For example, in FIG. 6, the MFP 140 counts the number of times that the speech patterns for the respective processings in each job type are used. The MFP 140 counts the number of times that the speech patterns for the three respective processings (stop, copy, and list printing) related to the print job are used. The MFP 140 also counts the number of times that the speech patterns for the three respective processings (stop, two-sided, and toner remaining amount checking) related to the copy job are used. The MFP 140 also counts the number of times that the speech patterns for the two respective processings (stop and PDF saving) related to the scan job are used. The MFP 140 also counts the number of times that the speech patterns for the three respective processings (stop, setting value list printing, and setting cancellation) related to the FAX job are used.

For example, when the speech from the second user B has been inputted during the execution of the print job and the copy job, a common speech pattern (the speech pattern of "stop" in the example in FIG. 6) as well as a speech pattern different from the common speech pattern are acquired in Step S20. In the present embodiment, the speech pattern that is used most frequently in both the print job and the copy job is identified. Note that this speech pattern is most frequently used in both the print job and the copy job, but may be used less in either the print job or the copy job. Moreover, this speech pattern is most frequently used in both the print job and the copy job and may also be most frequently used in either the print job or the copy job. In the present embodiment, suppose that the "speech pattern used most frequently" is a speech pattern for the processing "remaining toner amount checking". In the present embodiment, in Step S20, the analysis unit 203 acquires a common speech pattern as well as acquires the speech pattern used most frequently. That is, the analysis unit 203 acquires the speech pattern for the processing "stop" and the speech pattern for the processing "toner remaining amount checking". In Step S22, the analysis unit 203 performs the pattern matching between the speech inputted from the second user B and the speech pattern for the processing "stop" and the speech pattern for the processing "toner remaining amount checking".

When a plurality of jobs is being executed and a speech from the second user B is inputted, the MFP 140 according to the present embodiment analyzes the speech by using the speech pattern that meets the predetermined criterion in addition to the common speech pattern among the plurality of jobs. Therefore, it is possible to increase the types of speech that can be analyzed compared with the "MFP that analyzes speech by using a common speech pattern without using a speech pattern that meets the predetermined criterion".

Furthermore, the "speech pattern that meets the predetermined criterion" may be "another speech pattern". The "speech pattern that meets the predetermined criterion" may be decided in advance by, for example, an MFP administrator, or the like. Further, the "speech pattern that meets the predetermined criterion" may be a speech pattern that can maintain the analysis accuracy of the speech from the second user B. In addition, the MFP administrator or the like may decide the "speech pattern that meets the predetermined criterion" such that the analysis accuracy of the speech from the second user B can be maintained by the "common speech pattern" and the "speech pattern that meets the predetermined criterion".

Third Embodiment

Figure 11:
FIG. 11 is a diagram showing a speech pattern and the like according to another embodiment.

In the present embodiment, one job type is associated with a plurality of speech patterns. In addition, priorities are given to the plurality of speech patterns. FIG. 11 is a diagram showing an example of a speech pattern model according to the present embodiment. In the example in FIG. 11, suppose that the smaller the value of the priority, the higher the priority.

In the example in FIG. 11, "1", "2", and "3" are assigned as priorities to the respective processings "stop", "copy", and "print a list only", which are related to the print job. Moreover, "1", "2", and "3" are assigned as priories to the respective processings "stop", "two-sided", and "toner remaining amount checking", which are related to the copy job. Furthermore, "1" and "2" are assigned as priorities to the respective processings "stop" and "PDF saving", which are related to the scan job. Further, "1", "2", and "3" are assigned as priorities to the respective processings "stop", "setting cancellation", and "set value list printing", which are related to the FAX job. In addition, in the present embodiment, a high priority is given to "stop", which is a processing of stopping the job being executed.

Moreover, an MFP 140 according to the present embodiment uses the level of noise for each job generated by executing each job. FIG. 12 is a diagram showing an example of noise information in which a correspondence is defined between a job type and a level of job noise generated when the job is being executed. In the example in FIG. 12, 15 is assigned as a noise level to the print job. Fifteen is assigned as a noise level to the copy job. Eight is assigned as a noise level to the scan job. Six is assigned as a noise level to the FAX job. In the present embodiment, the noise information as shown in FIG. 12 is created in advance, and the MFP 140 stores the noise information.

In the present embodiment, when a job is being executed by the MFP 140 and the speech from the second user B is inputted, the noise level of the job being executed is acquired by using the noise information shown in FIG. 12. The MFP 140 according to the present embodiment does not adopt a configuration having a sensor or the like for detecting the noise of the job being executed.

Moreover, when a plurality of jobs is being executed by the MFP 140, for example, when the print job and the scan job are being executed, the noise (=15) of the print job and the noise (=8) of the scan job are added, and the resulting value (=23) is outputted as the noise level.

FIG. 13 is a diagram showing an example of priority information indicating the correspondence between the range of the noise level and the priority to the speech pattern to be used. An analysis unit 203 according to the present embodiment acquires a noise level from the information shown in FIG. 12. The analysis unit 203 identifies the priority to the speech pattern for the acquired noise level range.

In the example in FIG. 13, the priority "1" to the speech pattern to be used is assigned to a case where the range of the noise level is 20 or more. The priority "1, 2" to the speech pattern to be used is assigned to a case where the range of the noise level is 10 or more and less than 20. The priority "1 to 3" to the speech pattern to be used is assigned to a case where the range of the noise level is less than 10.

A main processing flow of the MFP 140 according to the present embodiment will be described. When a job is being executed by the MFP 140 and the speech from the second user B is inputted, the analysis unit 203 acquires, by using the noise information shown in FIG. 12, the noise level of the job being executed. Next, the analysis unit 203 identifies, by using the priority information shown in FIG. 13, the priority for the acquired noise level range. Next, referring to the model in FIG. 11, the analysis unit 203 uses the speech pattern for the processing with the identified priority in the type of job being executed to analyze the speech without using speech patterns other than the processing with the identified priority.

For example, suppose that a speech from second user B is inputted into the MFP 140 while the print job is being executed by the MFP 140. In this case, the analysis unit 203 identifies the noise level with reference to the information in FIG. 12. In the example in FIG. 12, the analysis unit 203 identifies "15" as the noise level. Next, the analysis unit 203 refers to the information in FIG. 13 and identifies that the priority is "1, 2" because the identified noise level is 10 or more and less than 20. Next, the analysis unit 203 acquires the speech patterns for the processings "stop" and "copy", which are the processings with the identified priority among the processings related to the print job in the model in FIG. 11. The analysis unit 203 analyzes the speech by using the acquired speech patterns for the processings "stop" and "copy".

As shown in FIG. 11, the priorities are given to the plurality of respective speech patterns of the MFP 140 according to the present embodiment. When the speech is inputted during the execution of a job, the analysis unit 203 analyzes the speech by using the priority, the job type acquired by the acquisition unit 208, and the speech patterns associated with the job type acquired by the acquisition unit 208. In the present embodiment, the analysis unit 203 acquires the noise level of the job from the job type acquired by the acquisition unit 208 with reference to the noise information in FIG. 12. That is, the analysis unit 203 analyzes the speech by using the priority, the noise level of the job being executed, and the speech patterns associated with the job type acquired by the acquisition unit 208. Therefore, the MFP 140 according to the present embodiment can decrease the number of speech patterns to be used in consideration of the noise level of the job being executed. In the present embodiment, as the noise level increases, the speech pattern with a higher priority is used, and the number of types of speech patterns used can be lowered. Therefore, the MFP 140 according to the present embodiment can further improve the analysis accuracy of the speech.

Note that, as a modification of the MFP 140 according to the present embodiment, the MFP 140 may include a sensor that detects the noise level of the job being executed. The analysis unit 203 may identify the priority to the speech pattern by using the noise level detected by the sensor and referring to the priority information in FIG. 13 without using the information in FIG. 12. Even with the configuration of such a modification, the MFP 140 analyzes the speech by using the noise level based on the job type acquired by the acquisition unit 208. Therefore, even the MFP 140 according to this modification analyzes the speech by using the priority, the noise level of the job being executed, and the speech patterns associated with the job type acquired by the acquisition unit 208.

Although embodiments of the present disclosure have been described and illustrated in detail, the disclosed embodiments are made for purposes of illustration and example only and not limitation. The scope of the present disclosure should be interpreted not by terms of the above description, but by terms of the appended claims, and is intended to include all modifications within the meaning and scope equivalent to the claims. Further, the disclosures described in the embodiments and the respective modifications are intended to be carried out alone or in combination as much as possible.

As used herein, the words "can" and "may" are used in a permissive (i.e., meaning having the potential to), rather than mandatory sense (i.e., meaning must). The words "include," "includes," "including," and the like mean including, but not limited to. Similarly, the singular form of "a" and "the" include plural references unless the context clearly dictates otherwise. And the term "number" shall mean one or an integer greater than one (i.e., a plurality).

What is claimed is:

1. An image forming apparatus, comprising:
    a storage that stores information in which a job type is associated with speech patterns for a plurality of processing related to the job type; and
    a hardware processor that:
        is inputted with a speech;
        acquires a job type;
        specifies, based on a job, which is acquired by the hardware processor and is being executed, the speech patterns associated with the job;
        uses the specified speech patterns to analyze a speech inputted during execution of the job; and
        executes the processing based on an analysis result by the hardware processor.

2. The image forming apparatus according to claim 1, wherein the number of types of speech patterns for the processing related to the job type is less than the number of types of speech patterns for the processing related to all job types that can be executed by the image forming apparatus.

3. The image forming apparatus according to claim 1, wherein the hardware processor analyzes a speech by using a common speech pattern between speech patterns associated with a first job and speech patterns associated with a second job, when the speech is inputted during execution of the first job and the second job.

4. The image forming apparatus according to claim 3, wherein the common speech pattern is a speech pattern for a processing of stopping the first job and the second job, which are being executed.

5. The image forming apparatus according to claim 3, wherein the hardware processor analyzes the speech by using the common speech pattern and a predetermined speech pattern.

6. The image forming apparatus according to claim 1, wherein the hardware processor analyzes a speech by a second technique different from a first technique that analyzes the speech by using the speech patterns associated with the job type acquired by the hardware processor.

7. The image forming apparatus according to claim 6, wherein the hardware processor executes pattern matching between a speech pattern inputted during execution of the job and the speech patterns associated with the job type acquired by the hardware processor, and
    wherein the hardware processor analyzes the speech by the second technique, when the pattern matching has failed.

8. The image forming apparatus according to claim 7, wherein the hardware processor executes the processing associated with the speech pattern based on success in the pattern matching, when the pattern matching has succeeded.

9. The image forming apparatus according to claim 6, wherein the hardware processor analyzes a speech by the second technique, when the speech is inputted during non-execution of a job.

10. The image forming apparatus according to claim 6, wherein the second technique is a technique based on morphological analysis.

11. The image forming apparatus according to claim 10, wherein the image forming apparatus causes a cloud server to execute the morphological analysis.

12. The image forming apparatus according to claim 1, wherein the hardware processor makes notification of the processing related to the job type acquired by the hardware processor.

13. The image forming apparatus according to claim 12, wherein the hardware processor causes a display to display an image that enables specification of the processing related to the job type acquired by the hardware processor.

14. The image forming apparatus according to claim 12, wherein the hardware processor causes a speaker to output the speech that enables specification of the processing related to the job type acquired by the hardware processor.

15. The image forming apparatus according to claim 1, wherein the hardware processor (i) identifies a speech pattern that has not been used for a predetermined period of time and (ii) analyzes a speech without using the speech pattern identified by the hardware processor, when the speech is inputted during execution of a job.

16. The image forming apparatus according to claim 1, wherein the information includes information in which a job type is associated with a plurality of speech patterns,
    wherein a priority is given to each of the plurality of the speech patterns, and
    wherein the hardware processor analyses the speech by using the priority, the job type acquired by the hardware processor, and the speech patterns associated with the job type acquired by the hardware processor, when the speech is inputted during execution of a job.

17. The image forming apparatus according to claim 1, wherein the hardware processor acquires the job type when the hardware processor executes the job.

18. The image forming apparatus according to claim 1, wherein the speech patterns include any one of speech patterns of a word, a phrase, a clause, a sentence, or a plurality of sentences.

19. A control method for an image forming apparatus, the method comprising:
- acquiring a job type;
- specifying, based on a job, which is acquired by a hardware processor and is being executed, speech patterns associated with the job;
- using the specified speech patterns to analyze a speech inputted during execution of the job; and
- executing a processing based on an analysis result of the speech.

20. A Don-transitory recording medium storing a computer-readable control program for an image forming apparatus, wherein the program causes a computer to perform:
- acquiring a job type;
- specifying, based on a job, which is acquired by the computer and is being executed, speech patterns associated with the job;
- using the specified speech patterns to analyze a speech inputted during execution of the job; and
- executing a processing based on an analysis result of the speech.

* * * * *